United States Patent
Ueda et al.

(10) Patent No.: US 7,531,258 B2
(45) Date of Patent: May 12, 2009

(54) FUEL CELL SYSTEM AND METHOD FOR DISCHARGING REACTION GAS FROM FUEL CELL

(75) Inventors: Kenichiro Ueda, Utsunomiya (JP); Yuji Matsumoto, Shioya-gun (JP); Kuniaki Ojima, Yuki (JP); Yoshikazu Murakami, Utsunomiya (JP); Shinji Yoshikawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 10/986,552

(22) Filed: Nov. 10, 2004

(65) Prior Publication Data

US 2005/0100768 A1 May 12, 2005

(30) Foreign Application Priority Data

Nov. 12, 2003 (JP) ............................. 2003-382619

(51) Int. Cl.
*H01M 8/04* (2006.01)
*H01M 8/00* (2006.01)

(52) U.S. Cl. ............................. 429/22; 429/34; 429/25; 429/13

(58) Field of Classification Search .................. 429/22, 429/34, 25, 13
See application file for complete search history.

(56) References Cited

U.S. PATENT DOCUMENTS

2005/0133283 A1* 6/2005 Horii .......................... 180/65.1

FOREIGN PATENT DOCUMENTS

| JP | 02-086070 | * | 3/1990 |
|---|---|---|---|
| JP | 2-86070 | | 3/1990 |
| JP | 2000-243417 | * | 9/2000 |
| JP | 2002-246045 | | 8/2002 |
| JP | 2003-115314 | | 4/2003 |
| JP | 2003-173807 | | 6/2003 |
| JP | 2003-308866 | * | 10/2003 |
| JP | 2003-317752 | | 11/2003 |
| WO | WO-03/010845 A2 | | 2/2003 |

* cited by examiner

*Primary Examiner*—Patrick Ryan
*Assistant Examiner*—Angela J. Martin
(74) *Attorney, Agent, or Firm*—Lahive & Cockfield, LLP; Anthony A. Laurentano

(57) ABSTRACT

A fuel cell system includes: a fuel cell in which electrical power generation is performed through chemical reactions of reaction gases being supplied thereto; a discharge path through which the reaction gases are discharged; a discharge valve provided on the discharge path and operated for discharging the reaction gases through the discharge path; an opening condition monitoring device for continuously monitoring a demanded opening condition of the discharge valve; and an opening condition renewing device for renewing the demanded opening condition of the discharge valve depending on the demanded opening condition of the discharge valve detected by the opening condition monitoring device when opening of the discharge valve is demanded. Opening of the discharge valve is controlled depending on the latest demanded opening condition which has been renewed by the opening condition renewing device.

4 Claims, 5 Drawing Sheets

FUEL CELL SYSTEM AND METHOD FOR DISCHARGING REACTION GAS FROM FUEL CELL

BACKGROUND OF THE INVENTION

1. Field of the Invention

The present invention relates to a fuel cell system, and to a method for discharging a reaction gas from a fuel cell.

Priority is claimed on Japanese Patent Application No. 2003-382619, filed Nov. 12, 2003, the content of which is incorporated herein by reference.

2. Description of the Related Art

As a type of fuel cell to be installed in a fuel cell powered vehicle, a fuel cell is known in which electrical power is generated through chemical reactions of reaction gases. Among such fuel cells, a type of fuel cell is known which includes an anode and a cathode that together sandwich a solid polymer electrolyte membrane therebetween, and in which a fuel gas (e.g., a hydrogen gas) is supplied to the anode, and an oxidizing gas (e.g., air containing oxygen) is supplied to the cathode so that chemical energy produced in an oxidation and reduction reaction of these reaction gases is directly output as electrical energy.

In this type of fuel cell, water is formed at the cathode area by the power generating reaction, and a portion of the formed water permeates the solid polymer electrolyte membrane so as to diffuse into the anode area. In addition, a small portion of nitrogen contained in air supplied to the cathode permeates the solid polymer electrolyte membrane so as to diffuse into the anode area, and is mixed with the hydrogen gas. The power generation operation in the fuel cell may become unstable due to impurities such as the formed water and nitrogen.

In particular, in a circulation type fuel cell in which an unreacted hydrogen gas that is discharged from fuel cell is recycled and supplied to the fuel cell again after being mixed with a fresh hydrogen gas in order to increase fuel efficiency, concentration of the above-mentioned impurities at the anode area tends to gradually increase.

In order to solve such a problem of the above type of fuel cell, concentration of the impurities contained in the hydrogen gas is reduced by discharging the hydrogen gas containing the above-mentioned impurities from a hydrogen circulation path periodically or depending on the state of power generation in the fuel cell (for example, refer to Japanese Unexamined Patent Application, First Publication No. 2000-243417).

According to a known process, when discharging of the impurities is demanded, e.g., when the operation time of power generation of the fuel cell reaches a predetermined time, a demanded discharge amount of the hydrogen gas containing impurities or a demanded discharge time of the hydrogen gas is determined depending on the present operation state of the fuel cell.

In such a process, because a flexible control operation is not carried out even when the demanded discharge amount of the hydrogen gas or the demanded discharge time of the hydrogen gas is changed due to change in the operation state of the fuel cell during an operation for discharging the impurities, various problems may be encountered.

For example, when the demanded discharged amount (or the demanded discharge time) after the operation state is changed is less the demanded discharge amount (or the demanded discharge time) that has been determined at the beginning of discharge of the impurities, an excessive amount of hydrogen gas containing impurities is discharged after the operation state is changed. As a result, the amount of consumed hydrogen is substantially increased, and the power generation efficiency is decreased. In addition, in the case in which the fuel cell system includes a dilution system that dilutes the hydrogen gas discharged from the hydrogen circulation path by mixing with a cathode off-gas discharged from the cathode area, it is difficult to make hydrogen concentration after dilution.

On the other hand, when the demanded discharge amount (or the demanded discharge time) after the operation state is changed is greater than the demanded discharge amount (or the demanded discharge time) that has been determined at the beginning of discharge of the impurities, an insufficient amount of hydrogen gas containing impurities may be discharged after the operation state is changed. As a result, stability of the power generation operation of the fuel cell may not be recovered.

SUMMARY OF THE INVENTION

In consideration of the above circumstances, an object of the present invention is to provide a fuel cell system in which a reaction gas is optimally discharged from a fuel cell even when the operation state of the fuel cell is changed during the operation for discharging the reaction gas.

In order to achieve the above object, the present invention provides a fuel cell system including: a fuel cell in which electrical power generation is performed through chemical reactions of reaction gases being supplied thereto; a discharge path through which the reaction gases are discharged; a discharge valve provided on the discharge path and operated for discharging the reaction gases through the discharge path; an opening condition monitoring device for continuously monitoring a demanded opening condition of the discharge valve; and an opening condition renewing device for renewing the demanded opening condition of the discharge valve depending on the demanded opening condition of the discharge valve detected by the opening condition monitoring device when opening of the discharge valve is demanded, wherein opening of the discharge valve is controlled depending on the latest demanded opening condition which has been renewed by the opening condition renewing device.

According to the fuel cell system configured as described above, when the demanded opening condition is changed, after opening of the discharge valve is demanded, due to change in the operation state of the fuel cell, the demanded opening condition is renewed, and the discharge valve is controlled depending on the latest demanded opening condition which has been renewed; therefore, discharging of the reaction gas can be continuously optimized depending the operation state of the fuel cell, and thus efficiency of power generation can be increased.

In the above fuel cell system, the demanded opening condition may be a demanded time of opening during which the discharge valve is to be opened, and the opening condition renewing device may be adapted to renew the demanded time of opening only when the demanded time of opening detected by the opening condition monitoring device is reduced.

According to the fuel cell system configured as described above, when the demanded time of opening is changed, after opening of the discharge valve is demanded, due to change in the operation state of the fuel cell, the demanded time of opening is renewed only when the demanded time of opening is reduced, and the discharge valve is controlled depending on the latest demanded time of opening which has been renewed; therefore, the amount of discharged reaction gas can be minimized. As a result, management of discharge of the reaction gas can be optimized, and efficiency of power generation can be increased.

In the above fuel cell system, the demanded opening condition may be a demanded amount of discharge to be discharged by opening the discharge valve, and the opening condition renewing device may be adapted to renew the demanded amount of discharge only when the demanded amount of discharge detected by the opening condition monitoring device is reduced.

According to the fuel cell system configured as described above, when the demanded amount of discharge is changed, after opening of the discharge valve is demanded, due to change in the operation state of the fuel cell, the demanded amount of discharge is renewed only when the demanded amount of discharge is reduced, and the discharge valve is controlled depending on the latest demanded amount of discharge which has been renewed; therefore, the amount of the discharged reaction gas can be minimized. As a result, management of discharge of the reaction gas can be optimized, and efficiency of power generation can be increased.

Another object of the present invention is to provide a method for discharging a reaction gas from a fuel cell by which the reaction gas is optimally discharged from the fuel cell even when the operation state of the fuel cell is changed during the operation for discharging the reaction gas.

In order to achieve the above object, the present invention provides a method for discharging a reaction gas from a fuel cell that includes a discharge path provided with a discharge valve, the method including: continuously monitoring a demanded opening condition of the discharge valve; renewing the demanded opening condition of the discharge valve depending on the demanded opening condition of the discharge valve when opening of the discharge valve is demanded; and opening the discharge valve depending on the latest demanded opening condition which has been renewed.

According to the above method for discharging a reaction gas from a fuel cell, when the demanded opening condition is changed, after opening of the discharge valve is demanded, due to change in the operation state of the fuel cell, the demanded opening condition is renewed, and the discharge valve is opened depending on the latest demanded opening condition which has been renewed; therefore, discharging of the reaction gas can be continuously optimized depending the operation state of the fuel cell, and thus efficiency of power generation can be increased.

In the above method, the demanded opening condition may be a demanded time of opening during which the discharge valve is to be opened, and the demanded time of opening may be renewed only when the demanded time of opening is reduced.

According to the above method, when the demanded time of opening is changed, after opening of the discharge valve is demanded, due to change in the operation state of the fuel cell, the demanded time of opening is renewed only when the demanded time of opening is reduced, and the discharge valve is opened depending on the latest demanded time of opening which has been renewed; therefore, the amount of discharged reaction gas can be minimized. As a result, management of discharge of the reaction gas can be optimized, and efficiency of power generation can be increased.

In the above method, the demanded opening condition may be a demanded amount of discharge to be discharged by opening the discharge valve, and the demanded amount of discharge may be renewed only when the demanded amount of discharge is reduced.

According to the above method, when the demanded amount of discharge is changed, after opening of the discharge valve is demanded, due to change in the operation state of the fuel cell, the demanded amount of discharge is renewed only when the demanded amount of discharge is reduced, and the discharge valve is opened depending on the latest demanded amount of discharge which has been renewed; therefore, the amount of discharged reaction gas can be minimized. As a result, management of discharge of the reaction gas can be optimized, and efficiency of power generation can be increased.

DESCRIPTION OF THE PREFERRED EMBODIMENTS

Embodiments of a fuel cell system having a discharge apparatus for a fuel cell according to the present invention will be explained below with reference to FIGS. 1 to 5.

First Embodiment

First, a first embodiment of a fuel cell system according to the present invention will be explained with reference to FIGS. 1 to 3.

Figure 1:
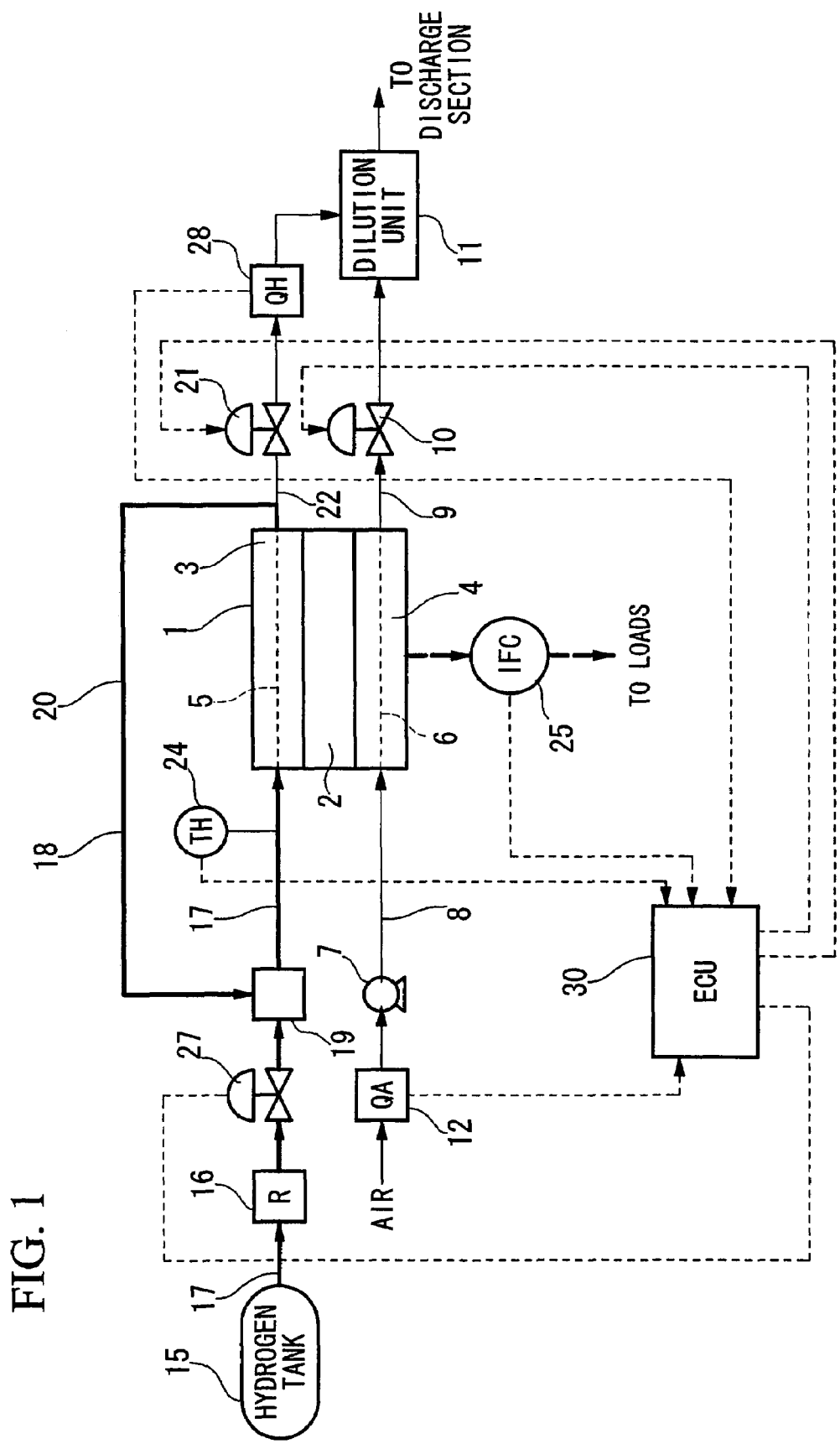
FIG. 1 is an example of a schematic block diagram of a fuel cell system having a discharge apparatus for a fuel cell according to the present invention.
Figure 2:
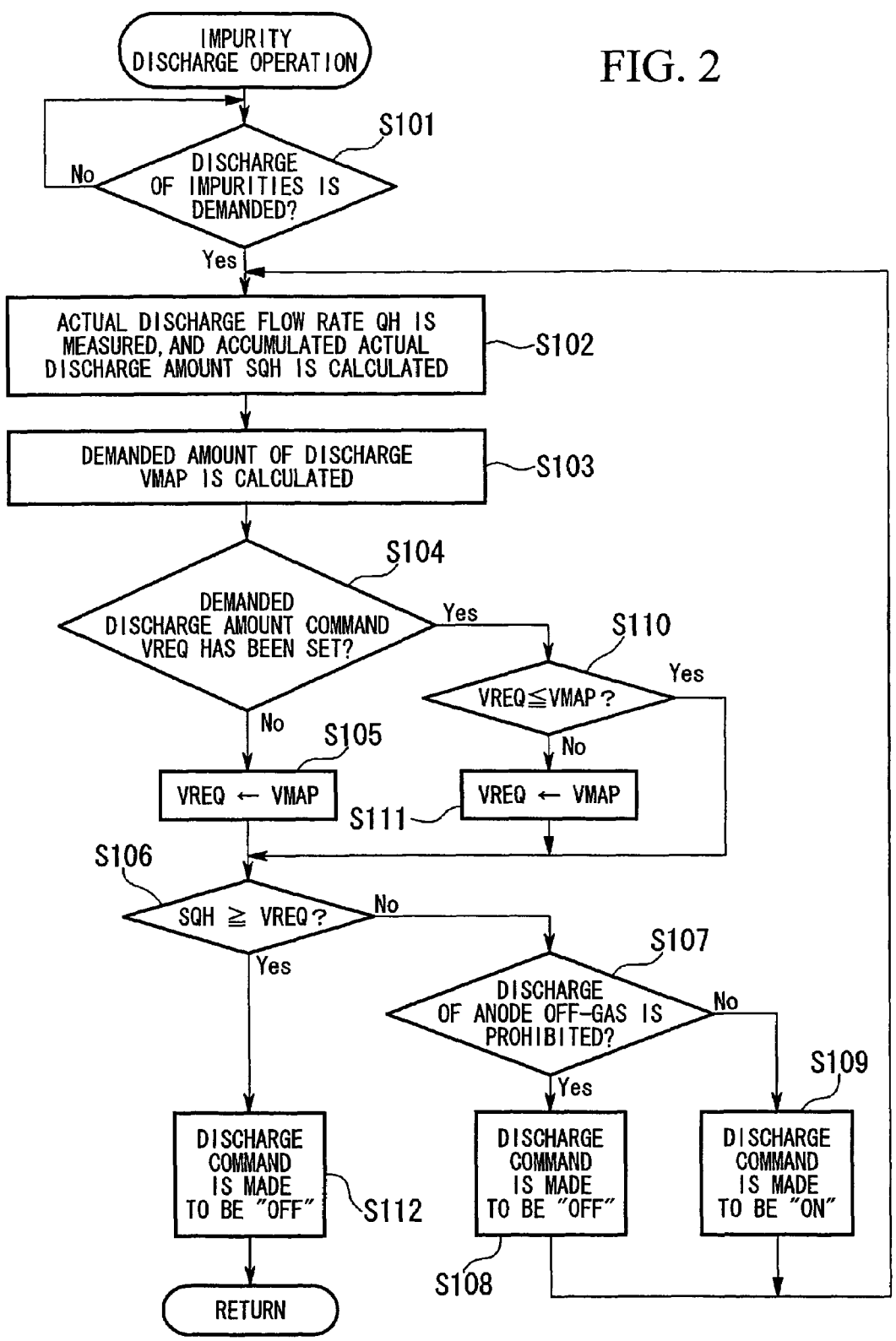
FIG. 2 is a flowchart showing a control routine for discharging impurities in a first embodiment of the present invention.

FIG. 1 is a schematic block diagram of a fuel cell system having a discharge apparatus for a fuel cell according to the present invention. The fuel cell system is installed in a fuel cell powered vehicle.

A fuel cell 1 is a type of fuel cell in which electrical power is generated through chemical reactions of reaction gases, and the fuel cell 1 is, for example, a stack that is formed by stacking a plurality of fuel cell units, each of which includes a solid polymer electrolyte membrane 2 consisting of, for example, a solid polymer ion exchange membrane, and an anode 3 and a cathode 4 that sandwich the solid polymer electrolyte membrane 2 therebetween (only one fuel cell unit is shown in FIG. 1). When a hydrogen gas (a reaction gas) as a fuel gas is supplied to a reaction gas flow path 5 at the anode 3, and air containing oxygen (a reaction gas) as an oxidizing gas is supplied to a reaction gas flow path 6 at the cathode 4, hydrogen ions are produced at the anode 3 by catalytic reaction, which pass through the solid polymer electrolyte membrane 2, and which reach the cathode 4 where the hydrogen ions electrochemically react with oxygen so that electrical power is generated, and water is formed. Because a portion of the water formed in the cathode area permeates the solid polymer electrolyte membrane 2 so as to diffuse into the anode area, there is also water in the anode area.

Air is pressurized by compressor 7, such as a super charger (S/C), to a predetermined pressure, and the pressurized air is supplied to the reaction gas flow path 6 at the cathode 4 of the fuel cell 1 through an air supply path 8. The air supplied to the fuel cell 1 is used for power generation, and is discharged from the fuel cell 1 to an air discharge path 9 along with formed water contained in the cathode area, and then the discharged air is introduced into a dilution device 11 via a pressure control valve 10. In the following description, the air supplied to the fuel cell 1 is referred to as "supplied air", and the air discharged from the fuel cell 1 is referred to as "discharged air", respectively, in order to distinguish them from each other. The air supply path 8 is provided, at a position upstream of the compressor 7, with an air flow sensor 12 for measuring a weight flow rate QA of air supplied to the fuel cell 1 (hereinafter abbreviated as air flow rate).

On the other hand, a hydrogen gas supplied from a hydrogen tank 15 flows through a hydrogen gas supply path. 17, and is depressurized to a predetermined pressure by a regulator 16 provided on the hydrogen gas supply path 17. The depressurized hydrogen gas is supplied to the reaction gas flow path 5 at the anode 3 of the fuel cell 1 through an ejector 19 after the flow rate thereof is controlled to a predetermined flow rate by a flow rate control valve 27. Unreacted hydrogen gas, i.e., a hydrogen gas which has not been consumed, is discharged from the fuel cell 1 as an anode off-gas (i.e., a residual reaction gas). The anode off-gas is drawn into the ejector 19 via an anode off-gas flow path 18, and is again supplied to the anode 3 of the fuel cell 1 after being mixed with a fresh hydrogen gas supplied from the hydrogen tank 15. More specifically, the anode off-gas discharged from the fuel cell 1 circulates through the fuel cell 1 via the anode off-gas flow path 18 and a portion of the hydrogen gas supply path 17 downstream of the ejector 19. In this embodiment, the portion of the hydrogen gas supply path 17 downstream of the ejector 19 and the anode off-gas flow path 18 together from a fuel gas circulation path 20.

The portion of the hydrogen gas supply path 17 downstream of the ejector 19 is provided with an anode inlet temperature sensor 24 for measuring the temperature TH of the hydrogen gas (hereinafter referred to as anode inlet temperature) just before entering into the reaction gas flow path 5 at the anode 3.

An anode off-gas discharge path 22 (a discharge flow path) provided with a discharge valve 21 branches off the anode off-gas flow path 18, and is connected to a dilution unit 11. The anode off-gas discharge path 22 is provided, at a position downstream of the discharge valve 21, with an anode off-gas flow rate sensor 28 for measuring the weight flow rate QH of the anode off-gas (hereinafter referred to as anode off-gas flow rate) that is discharged from the discharge valve 21. The anode off-gas discharged from the anode off-gas discharge path 22 is diluted in the dilution unit 11 by being mixed with a discharged air that is discharged from an air discharge path 9, and then the diluted anode off-gas is discharged from the dilution unit 11.

Electrical energy generated in the fuel cell 1 is supplied to electrical loads such as a motor for driving the vehicle. At that time, generated current IFC is measured by an ammeter 25.

The fuel cell 1 is controlled by an electric control unit 30 (hereinafter referred to as an ECU). In order to achieve such a control operation, signals from an air flow rate sensor 12, the anode inlet temperature sensor 24, the ammeter 25, anode off-gas flow rate sensor 28, etc., are input to the ECU 30, and the ECU 30 controls the revolution rate of the compressor 7, the opening degrees of the flow rate control valve 27 and the pressure control valve 10, opening and closing of the discharge valve 21, etc.

When the fuel cell system constructed as described above is continuously operated, the power generation operation of the fuel cell 1 may become unstable due to increase of impurities (e.g., water, nitrogen, etc.) in the hydrogen gas flowing through the fuel gas circulation path 20, as mentioned above.

In order to solve such a problem, in this fuel cell system, the discharge valve 21 is opened at every predetermined period during which the fuel cell 1 is continuously operated, or the discharge valve 21 is opened depending on the power generation operation state of the fuel cell 1, so that the anode off-gas containing impurities is discharged from the fuel gas circulation path 20 into the dilution unit 11 via the anode off-gas discharge path 22 (hereinafter this operation is referred to as impurity discharge operation), by which concentration of the impurities contained in the hydrogen gas that flows through the anode 3 of the fuel cell 1 is maintained to be less than a predetermined value, and thus the power generation operation of the fuel cell 1 is maintained to be stable.

In the fuel cell system according to this embodiment, when discharging of impurities is demanded, the amount of anode off-gas to be discharged from the fuel gas circulation path 20 (hereinafter referred to as demanded amount of discharge) is continuously calculated depending on the power generation state (i.e., operation state) of the fuel cell 1 during the impurity discharge operation, and when the demanded amount of discharge is reduced during the impurity discharge operation, the demanded amount of discharge is renewed to be the latest one, and opening of the discharge valve 21 is controlled depending on the demanded amount of discharge which has been renewed. As a result, the amount of the hydrogen gas, which has not contributed to power generation and is discharged with impurities, can be minimized even when the demanded amount of discharge is reduced due to change in the operation state of the fuel cell 1 during the impurity discharge operation.

In this embodiment, the demanded amount of discharge serves as a demanded opening condition.

Next, the control routine of the impurity discharge operation in the first embodiment will be explained with reference to the flowchart shown in FIG. 2.

In step S101, it is determined whether the discharge of impurities is demanded. In the first embodiment, it is determined that discharge of impurities is demanded when time of the continuous power generation operation of fuel cell 1 reaches a predetermined value, or when the lowest one of cell voltages of the fuel cell 1 becomes lower than a predetermined lower limit voltage.

When the result of the determination in step S101 is "NO", i.e., the discharge of impurities is not demanded, the operation returns to step S101.

When the result of the determination in step S101 is "YES", i.e., the discharge of impurities is demanded, the operation proceeds to step S102, in which the actual discharge flow rate QH of the anode off-gas is measured by the anode off-gas flow rate sensor 28, and an accumulated actual discharge amount SQH is calculated by accumulating the actual discharge flow rate QH. Just after the operation proceeded to from step S101 to step S102, a discharge command is not in the "ON" state, and the discharge valve is not opened; therefore, both the actual discharge flow rate QH and the accumulated actual discharge amount SQH are zero.

Next, the operation proceeds from step S102 to step S103, in which the demanded amount of discharge VMAP of the anode off-gas is calculated depending on the present power generation operation state with reference to a map (not shown). The demanded amount of discharge VMAP can be calculated based on, for example, the generated current IFC of the fuel cell 1 and the anode inlet temperature TH. In this embodiment, the demanded amount of discharge VMAP is set to be a greater value as the generated current IFC is greater, and as the anode inlet temperature TH is lower.

Next, the operation proceeds from step S103 to step S104, in which it is determined whether a demanded discharge amount command VREQ has been set.

When the operation in step S104 is executed for the first time after it is determined in step S103 that the discharge of impurities is demanded, demanded discharge amount command VREQ has not been set; therefore, the result of the determination in step S104 is "NO", and then the operation proceeds to step S105. In step S105, the demanded discharge amount command VREQ is set to be the demanded amount of discharge VMAP calculated in step S103.

Next, the operation proceeds from step S105 to step S106, in which it is determined whether the accumulated actual discharge amount SQH calculated in step S102 is greater than or equal to the demanded discharge amount command VREQ.

When the result of the determination in step S106 is "NO", i.e., SQH<VREQ, the operation proceeds to step S107, in which it is determined whether the discharge of the anode off-gas is prohibited.

When the result of the determination in step S107 is "YES", i.e., the discharge of the anode off-gas is prohibited, the operation proceeds to step S108, in which a discharge command is made to be "OFF". In this case, opening of the discharge valve 21 is not allowed; therefore, the anode off-gas is not discharged from the anode off-gas flow path 18.

On the other hand, when the result of the determination in step S107 is "NO", i.e., the discharge of the anode off-gas is allowed, the operation proceeds to step S109, in which the discharge command is made to be "ON". In this case, opening of the discharge valve 21 is allowed; therefore, the anode off-gas is discharged from the anode off-gas flow path 18 into the dilution unit 11.

After executing the operation in step S108 or step S109, the operation returns to step S102, and then the operations thereafter are repeated.

More specifically, in step S102, the actual discharge flow rate QH of the anode off-gas is measured again, and the accumulated actual discharge amount SQH is calculated again. In step S103, the demanded amount of discharge VMAP of the anode off-gas is calculated again depending on the present power generation operation state. In step S104, it is determined whether the demanded discharge amount command VREQ has been set. When the operation returns to step S102 after executing the operation in step S108 or step S109, the result of the determination in step S104 is "YES", i.e., it is determined that the demanded discharge amount command VREQ has been set; therefore, the operation proceeds to step S110.

In step S110, it is determined whether the demanded amount of discharge VMAP calculated in the immediately previous step S103 is greater than or equal to the demanded discharge amount command VREQ having been set.

When the result of the determination in step S110 is "YES", i.e., VREQ≦VMAP, the operation proceeds to step S106. In other words, in this case, the demanded discharge amount command VREQ is not renewed, and the demanded discharge amount command VREQ having been set is, as it is, used in the operation in step S106.

On the other hand, when the result of the determination in step S110 is "NO", i.e., VREQ>VMAP, the operation proceeds to step S111, in which the demanded discharge amount command VREQ is set to be the demanded amount of discharge VMAP calculated in the immediately previous step S103. In other words, in this case, the demanded discharge amount command VREQ is renewed to be the latest demanded amount of discharge VMAP, and the operation in step S106 is executed based on the renewed and latest demanded discharge amount command VREQ.

When the accumulated actual discharge amount SQH becomes equal to or greater than the demanded discharge amount command VREQ, the result of the determination in step S106 is "YES", i.e., SQH≧VREQ; therefore, the operation proceeds to step S112, in which the discharge command is made to be "OFF", and then the operations in this routine is once terminated, i.e., the discharge valve 21 is closed because the discharge command is in the "OFF" state.

According to the control operation for discharging impurities in the first embodiment, when discharging of impurities is demanded, the demanded amount of discharge VMAP of the anode off-gas, which depends on the present power generation operation state of the fuel cell 1, is continuously calculated (step S103), and only when the latest demanded amount of discharge VMAP becomes less than the demanded discharge amount command VREQ having been set, the demanded discharge amount command VREQ is renewed to be the latest demanded amount of discharge VMAP (step S111); therefore, when the demanded amount of discharge VMAP is reduced due to change in the operation state of the fuel cell 1, the demanded discharge amount command VREQ can be reduced depending on the demanded amount of discharge VMAP even during the impurity discharge operation. As a result, the accumulated actual discharge amount SQH can be minimized, and the amount of the discharged anode off-gas containing impurities can be optimized.

Accordingly, because the amount of the hydrogen gas, which has not contributed to power generation and is discharged with impurities, can be minimized, efficiency of power generation can be increased. Moreover, because the flow rate of the hydrogen gas flowing into the dilution unit 11 is optimized, the hydrogen concentration after dilution can be made stable.

In the first embodiment, the execution of the operation in step S103 by the ECU 30 serves as an opening condition monitoring device for continuously monitoring a demanded opening condition of the discharge valve 21 (i.e., the demanded amount of discharge VMAP), and the execution of the operation in step S111 by the ECU 30 serves as an opening condition renewing device for renewing the demanded opening condition of the discharge valve 21 depending on the continuously monitored demanded opening condition (i.e., the demanded amount of discharge VMAP).

Figure 3:
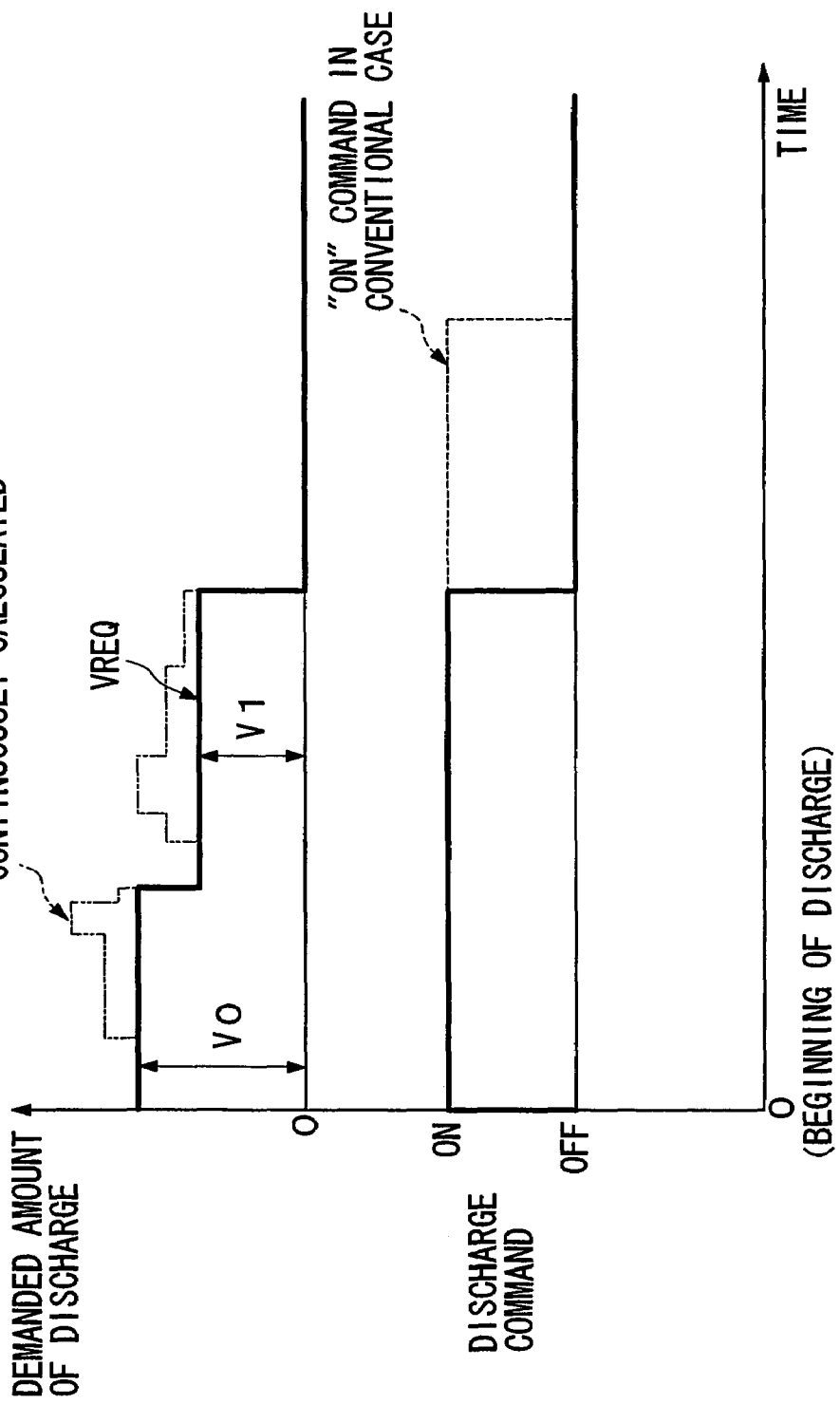
FIG. 3 is a time-domain chart in the first embodiment.

FIG. 3 is a time-domain chart showing the demanded amount of discharge (the demanded discharge amount command) and the discharge command in the first embodiment. This example corresponds to a case in which the demanded amount of discharge VMAP calculated at the beginning of the impurity discharge operation is "V0", the demanded amount of discharge increases and decreases as indicated by a two-dot chain line in accordance with the power generation state of the fuel cell 1, and the demanded amount of discharge becomes "V1", which is less than "V0", during the impurity discharge operation. In FIG. 3, the solid line in the graph of the demanded amount of discharge indicates the demanded discharge amount command VREQ, only when the demanded amount of discharge VMAP decreases from "V0" to "V1", the demanded discharge amount command VREQ is renewed from "V0" to "V1".

In contrast, in conventional fuel cell systems, the demanded discharge amount command VREQ is set to be the demanded amount of discharge VMAP at the beginning of the impurity discharge operation, and the demanded discharge amount command VREQ is not changed even when the power generation state of the fuel cell 1 is changed. Accordingly, because an excessive amount of anode off-gas may be discharged, the power generation efficiency may be decreased, or because the amount of the anode off-gas flowing into the dilution unit 11 may be increased, it is difficult to make the hydrogen concentration after dilution to be stable. According to the discharge apparatus in the first embodiment, such problems can be solved.

In the first embodiment, the demanded amount of discharge VMAP of the anode off-gas, which depends on the present power generation operation state of the fuel cell 1, is continuously calculated, and only when the latest demanded amount of discharge VMAP becomes less than the demanded discharge amount command VREQ having been set, the demanded discharge amount command VREQ is renewed to be the latest demanded amount of discharge VMAP; however, the demanded discharge amount command VREQ may also be renewed to be the latest demanded amount of discharge VMAP when the latest demanded amount of discharge VMAP is greater than or equal to the demanded discharge amount command VREQ having been set. According to this control operation, the demanded discharge amount command VREQ can be increased depending on the demanded amount of discharge VMAP even when the demanded amount of discharge VMAP due to change in the operation state of the fuel cell 1. As a result, the accumulated actual discharge amount SQH of the anode off-gas can be optimized without shortage or excessiveness, and the amount of the discharged anode off-gas containing impurities can be optimized. Accordingly, in addition to the advantageous effects obtainable by the first embodiment, stability of the power generation operation of the fuel cell 1 can be recovered even when the demanded amount of discharge VMAP is increased due to change in the operation state of the fuel cell 1 during the discharge operation.

Second Embodiment

Figure 4:
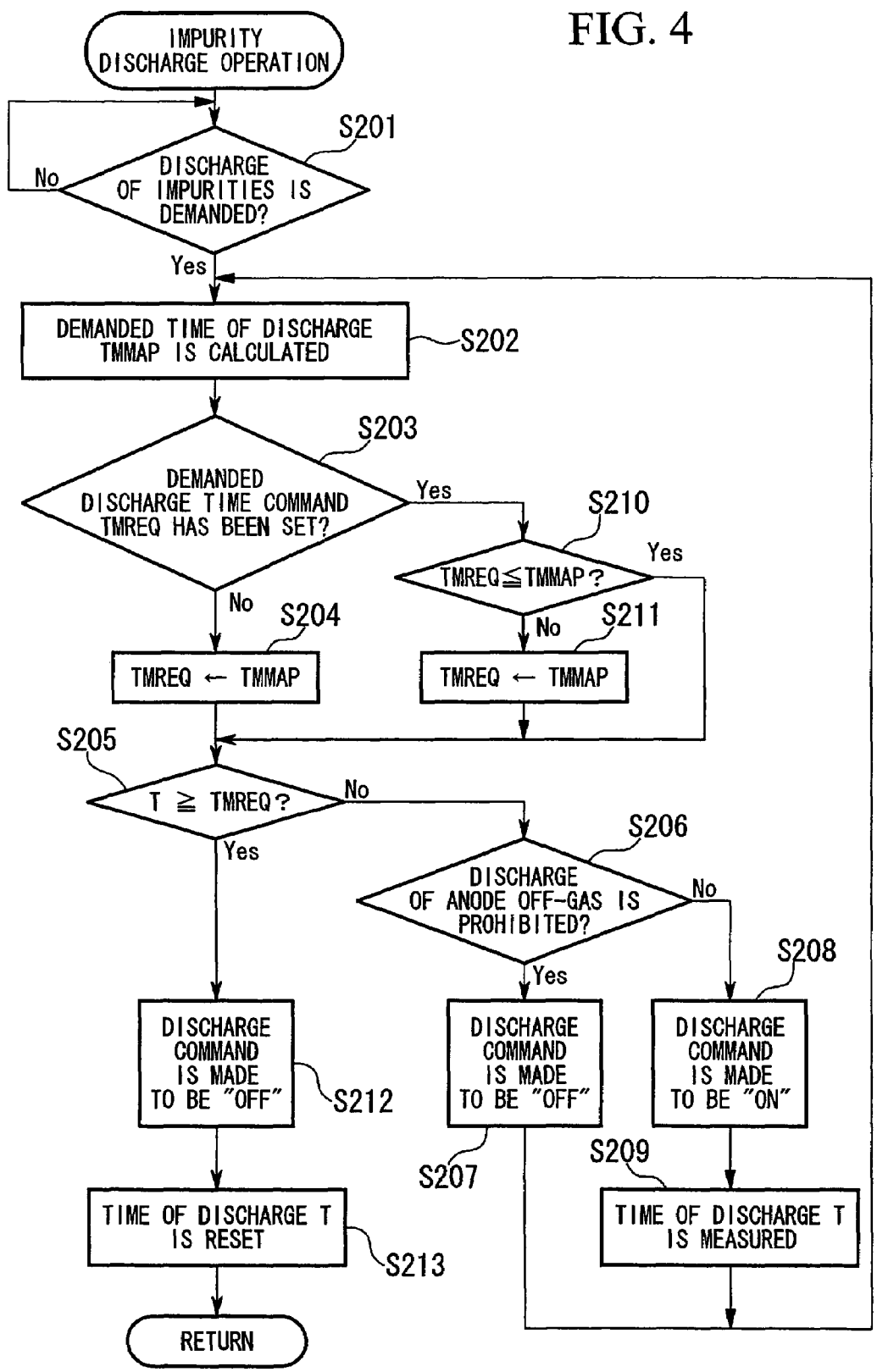
FIG. 4 is a flowchart showing a control routine for discharging impurities in a second embodiment of the present invention.

Next, a second embodiment of a fuel cell system according to the present invention will be explained with reference to FIGS. 4 and 5.

In the first embodiment, the demanded amount of discharge is employed as the demanded opening condition; however, in the second embodiment, a demanded time of discharge (demanded time of opening) during which the discharge valve 21 is to be opened, is employed as the demanded opening condition.

More specifically, in the fuel cell system according to the second embodiment, when discharging of impurities is demanded, the demanded time of discharge, which corresponds to the amount of discharge in the first embodiment, is continuously calculated depending on the power generation state (i.e., operation state) of the fuel cell 1 during the impurity discharge operation, and when the demanded time of discharge is reduced during the impurity discharge operation, the demanded time of discharge is renewed to be the latest one, and opening of the discharge valve 21 is controlled depending on the demanded time of discharge which has been renewed. As a result, as in the first embodiment, the amount of the hydrogen gas, which has not contributed to power generation and is discharged with impurities, can be minimized even when the demanded time of discharge is reduced due to change in the operation state of the fuel cell 1 during the impurity discharge operation.

Next, the control routine of the impurity discharge operation in the first embodiment will be explained with reference to the flowchart shown in FIG. 4.

In step S201, it is determined whether the discharge of impurities is demanded. The determination as to whether the discharge of impurities is demanded is the same as in the first embodiment, i.e., it is determined that discharge of impurities is demanded when time of the continuous power generation operation of fuel cell 1 reaches a predetermined value, or when the lowest one of cell voltages of the fuel cell 1 becomes lower than a predetermined lower limit voltage.

When the result of the determination in step S201 is "NO", i.e., the discharge of impurities is not demanded, the operation returns to step S201.

When the result of the determination in step S201 is "YES", i.e., the discharge of impurities is demanded, the operation proceeds to step S202, in which the demanded time of discharge TMMAP of the anode off-gas is calculated depending on the present power generation operation state with reference to a map (not shown). The demanded time of discharge TMMAP corresponds to the demanded amount of discharge VMAP in the first embodiment, and the demanded time of discharge TMMAP can be calculated based on, for example, the generated current IFC of the fuel cell 1 and the anode inlet temperature TH. In this embodiment, the demanded time of discharge TMMAP is set to be a greater value as the generated current IFC is greater, and as the anode inlet temperature TH is lower.

Next, the operation proceeds from step S202 to step S203, in which it is determined whether a demanded discharge time command TMREQ has been set.

When the operation in step S203 is executed for the first time after it is determined in step S201 that the discharge of impurities is demanded, demanded discharge time command TMREQ has not been set; therefore, the result of the determination in step S203 is "NO", and then the operation proceeds to step S204. In step S204, the demanded discharge time command TMREQ is set to be the demanded time of discharge TMMAP calculated in step S202.

Next, the operation proceeds from step S204 to step S205, in which it is determined whether an elapsed time T (i.e., time of discharge) since the discharge valve 21 is opened is greater than or equal to the demanded discharge time command TMREQ. Just after the operation proceeded to from step S201 to step S202, the time of discharge T is reset; therefore, the time of discharge T is zero.

When the result of the determination in step S205 is "NO", i.e., T<TMREQ, the operation proceeds to step S206, in which it is determined whether the discharge of the anode off-gas is prohibited.

When the result of the determination in step S206 is "YES", i.e., the discharge of the anode off-gas is prohibited, the operation proceeds to step S207, in which a discharge command is made to be "OFF". In this case, opening of the discharge valve 21 is not allowed; therefore, the anode off-gas is not discharged from the anode off-gas flow path 18.

On the other hand, when the result of the determination in step S206 is "NO", i.e., the discharge of the anode off-gas is allowed, the operation proceeds to step S208, in which the discharge command is made to be "ON", and then the operation further proceeds to step S209, in which the time of discharge T is measured. Because the discharge command is made to be "ON", opening of the discharge valve 21 is allowed; therefore, the anode off-gas is discharged from the anode off-gas flow path 18 into the dilution unit 11.

After executing the operation in step S207 or step S209, the operation returns to step S202, and then the operations thereafter are repeated.

More specifically, in step S202, the demanded time of discharge TMMAP of the anode off-gas, which depends on the present power generation operation state, is calculated again. In step S203, it is determined whether the demanded time of discharge TMMAP has been set. When the operation returns to step S202 after executing the operation in step S207 or step S209, the result of the determination in step S203 is "YES", i.e., it is determined that the demanded time of discharge TMMAP has been set; therefore, the operation proceeds to step S210.

In step S210, it is determined whether the demanded time of discharge TMMAP calculated in the immediately previous step S202 is greater than or equal to the demanded discharge time command MTREQ having been set.

When the result of the determination in step S210 is "YES", i.e., TMREQ≦TMMAP, the operation proceeds to step S205. In other words, in this case, the demanded discharge time command TMREQ is not renewed, and the demanded discharge time command TMREQ having been set is, as it is, used in the operation in step S205.

On the other hand, when the result of the determination in step S210 is "NO", i.e., TMREQ>TMMAP, the operation proceeds to step S211, in which the demanded discharge time command TMREQ is set to be the demanded time of discharge TMMAP calculated in the immediately previous step S203. In other words, in this case, the demanded discharge time command TMREQ is renewed to be the latest demanded time of discharge TMMAP, and the operation in step S205 is executed based on the renewed and latest demanded discharge time command TMREQ.

When the time of discharge T becomes equal to or greater than the demanded discharge time command TMREQ, the result of the determination in step S205 is "YES", i.e., T≧TMREQ; therefore, the operation proceeds to step S212, in which the discharge command is made to be "OFF", and the operation further proceeds to step S213, in which time of discharge is reset, and then the operations in this routine is once terminated, i.e., the discharge valve 21 is closed because the discharge command is in the "OFF" state.

According to the control operation for discharging impurities in the second embodiment, when discharging of impurities is demanded, the demanded time of discharge TMMAP of the anode off-gas, which depends on the present power generation operation state of the fuel cell 1, is continuously calculated (step S202), and only when the latest demanded time of discharge TMMAP becomes less than the demanded discharge time command TMREQ having been set, the demanded discharge time command TMREQ is renewed to be the latest demanded time of discharge TMMAP (step S211); therefore, when the demanded time of discharge TMMAP is reduced due to change in the operation state of the fuel cell 1, the demanded discharge time command TMREQ can be reduced depending on the demanded time of discharge TMMAP even during the impurity discharge operation. As a result, the actual discharge amount of anode off-gas can be minimized, and the amount of the discharged anode off-gas containing impurities can be optimized.

Accordingly, because the amount of the hydrogen gas, which has not contributed to power generation and is discharged with impurities, can be minimized, efficiency of power generation can be increased. Moreover, because the flow rate of the hydrogen gas flowing into the dilution unit 11 is optimized, the hydrogen concentration after dilution can be made stable.

In the second embodiment, the execution of the operation in step S202 by the ECU 30 serves as an opening condition monitoring device for continuously monitoring a demanded opening condition of the discharge valve 21 (i.e., the demanded time of discharge TMMAP), and the execution of the operation in step S211 by the ECU 30 serves as an opening condition renewing device for renewing the demanded opening condition of the discharge valve 21 depending on the continuously monitored demanded opening condition (i.e., the demanded time of discharge TMMAP).

Figure 5:
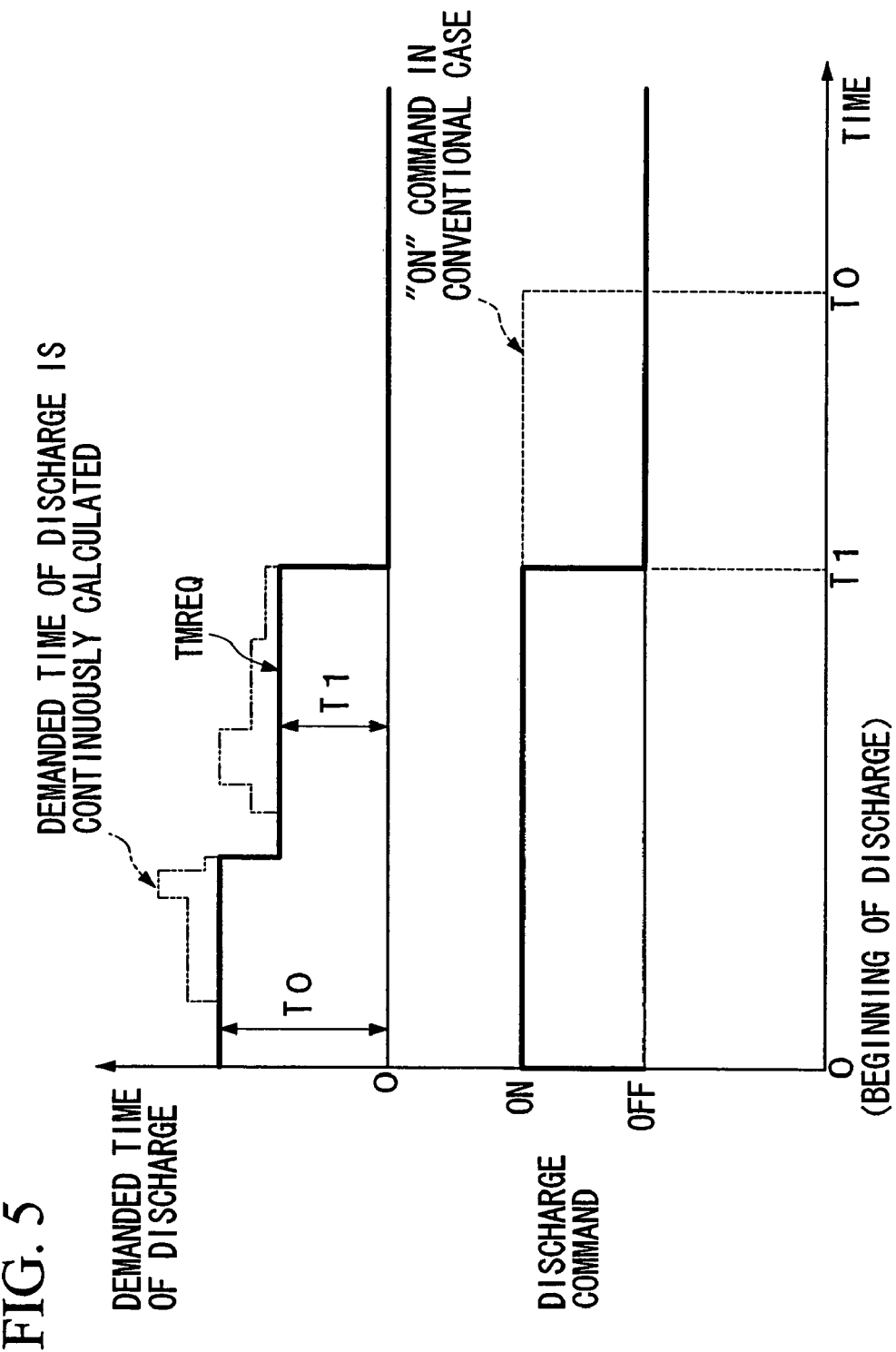
FIG. 5 is a time-domain chart in the second embodiment.

FIG. 5 is a time-domain chart showing the demanded amount of discharge (the demanded discharge time command) and the discharge command in the second embodiment. This example corresponds to a case in which the demanded time of discharge TMMAP calculated at the beginning of the impurity discharge operation is "T0", the demanded time of discharge increases and decreases as indicated by a two-dot chain line in accordance with the power generation state of the fuel cell 1, and the demanded time of discharge becomes "T1", which is less than "T0", during the impurity discharge operation. In FIG. 5, the solid line in the graph of the demanded time of discharge indicates the demanded discharge time command TMREQ, only when the demanded time of discharge TMMAP decreases from "T0" to "T1", the demanded discharge time command TMREQ is renewed from "T0" to "T1".

In contrast, in conventional fuel cell systems, the demanded discharge time command TMREQ is set to be the demanded time of discharge TMMAP at the beginning of the impurity discharge operation, and the demanded discharge time command TMREQ is not changed even when the power generation state of the fuel cell 1 is changed. Accordingly, because an excessive amount of anode off-gas may be discharged, the power generation efficiency may be decreased, or because the amount of the anode off-gas flowing into the dilution unit 11 may be increased, it is difficult to make the hydrogen concentration after dilution to be stable. According to the discharge apparatus in the second embodiment, such problems can be solved.

In the second embodiment, the demanded time of discharge TMMAP of the anode off-gas, which depends on the present power generation operation state of the fuel cell 1, is continuously calculated, and only when the latest demanded time of discharge TMMAP becomes less than the demanded discharge time command TMREQ having been set, the demanded discharge time command TMREQ is renewed to be the latest demanded time of discharge TMMAP; however, the demanded discharge time command TMREQ may also be renewed to be the latest demanded time of discharge TMMAP when the latest demanded time of discharge TMMAP is greater than or equal to the demanded discharge time command TMREQ having been set. According to this control operation, the demanded discharge time command TMREQ can be increased depending on the demanded time of discharge TMMAP even when the demanded time of discharge TMMAP due to change in the operation state of the fuel cell 1. As a result, the actual discharge amount of the anode off-gas can be optimized without shortage or excessiveness, and the amount of the discharged anode off-gas containing impurities can be optimized. Accordingly, in addition to the advantageous effects obtainable by the second embodiment, stability of the power generation operation of the fuel cell 1 can be recovered even when the demanded time of discharge TMMAP is increased due to change in the operation state of the fuel cell 1 during the discharge operation.

In the embodiments described above, it is the anode off-gas that is to be discharged as a residual reaction gas from the discharge valve whose opening is controlled; however, the present invention may be applied to a fuel cell system in which a cathode off-gas that is a residual reaction gas discharged from the cathode of the fuel cell is recycled into the cathode. In this case, it is the cathode off-gas that is to be discharged as a residual reaction gas from the discharge valve whose opening is controlled.

Moreover, in the present invention, the fuel gas for the fuel cell is not limited to a pure hydrogen gas, and the fuel gas may be a hydrogen rich gas which is produced by reforming a fuel containing hydrocarbon.

The fuel cell system in the present invention is not limited to a type of fuel cell system to be installed in a fuel cell powered vehicle as described in the above embodiments, and the fuel cell system may be of a stationary type.

Moreover, the discharge valve in the embodiments described above is an ON-OFF valve; however, the discharge valve may be a valve which can regulate flow rate.

Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for discharging a reaction gas from a fuel cell that comprises an anode, a cathode, and a discharge path provided with a discharge valve, the method comprising:
   continuously monitoring whether discharging of the reaction gas is demanded;
   calculating a calculated amount of discharge to be discharged by opening the discharge valve when discharging of the reaction gas is demanded;
   setting a demanded amount of discharge depending on the calculated amount of discharge; and
   controlling opening of the discharge valve depending on the demanded amount of discharge, wherein
   the calculated amount of discharge increases as a generated current of the fuel cell increases, and as a temperature at an inlet of the anode decreases.

2. A method according to claim 1, wherein the demanded amount of discharge is set to be equal to the calculated amount of discharge only when the calculated amount of discharge is less than a current value of the demanded amount of discharge.

3. A method for discharging a reaction gas from a fuel cell that comprises an anode, a cathode, and a discharge path provided with a discharge valve, the method comprising:
   continuously monitoring whether discharging of the reaction gas is demanded;
   calculating a calculated time of opening of the discharge valve when discharging of the reaction gas is demanded;
   setting a demanded time of opening depending on the calculated time of opening; and
   controlling opening of the discharge valve depending on the demanded time of opening, wherein
   the calculated time of discharge increases as a generated current of the fuel cell increases, and as a temperature at an inlet of the anode decreases.

4. A method according to claim 3, wherein the demanded time of opening is set to be equal to the calculated time of opening only when the calculated time of opening is less than a current value of the demanded time of opening.

* * * * *